United States Patent

[11] 3,624,550

[72] Inventor Arthur B. Vane
Menlo Park, Calif.
[21] Appl. No. 833,478
[22] Filed June 16, 1969
[45] Patented Nov. 30, 1971
[73] Assignee Varian Associates
Palo Alto, Calif.

[54] MICROWAVE OSCILLATOR CIRCUIT FOR A BULK-EFFECT NEGATIVE-RESISTANCE DEVICE

5 Claims, 6 Drawing Figs.

[52] U.S. Cl. 331/96, 331/101, 331/107 G, 333/73, 333/84 M
[51] Int. Cl. H03b 7/14
[50] Field of Search 331/96, 99, 107 G, 101; 333/84 M, 73

[56] References Cited

UNITED STATES PATENTS

| | | | |
|---|---|---|---|
| 3,416,099 | 12/1968 | Vane | 331/107 G |
| 3,512,105 | 5/1970 | Lance, Jr. et al. | 331/96 |

OTHER REFERENCES

Carroll, " Resonant-Circuit Operation of Gunn Diodes: A Self-pumped Parametric Oscillator," Electronics Letters, Vol. 2, June 1966, pp. 215, 216. (331- 107 G)

*Primary Examiner*—Roy Lake
*Assistant Examiner*—Siegfried H. Grimm
*Attorneys*—Stanley Z. Cole and Gerald L. Moore

ABSTRACT: A microwave oscillator circuit for a high-power high-efficiency negative-resistance bulk-effect device is disclosed. The circuit includes a half-wavelength open-circuited length of stripline transmission line provided with variable lumped capacitors at opposite ends thereof, such capacitors serving to tune the stripline for a fundamental mode of resonance at the operating frequency of the oscillator. The low-impedance bulk-effect device is connected across the stripline at a point near the voltage null of the fundamental resonance. The characteristic impedance and the length of the stripline are adjusted such that the reactance of the line and the reactance of the capacitors at the ends allow the circuit to support full wave resonance at precisely twice the fundamental frequency and therefore develop a second harmonic voltage across the bulk-effect device to improve the conversion efficiency of the oscillator. Power is extracted from the oscillator circuit by means of a filter circuit tuned to pass the fundamental frequency and reject the harmonic. The invention herein described was made in the course of or under a contract or subcontract thereunder with the Department of the Air Force.

INVENTOR
ARTHUR B. VANE

BY Stanley Z. Cole
ATTORNEY

MICROWAVE OSCILLATOR CIRCUIT FOR A BULK-EFFECT NEGATIVE-RESISTANCE DEVICE

DESCRIPTION OF THE PRIOR ART

Heretofore, microwave oscillator circuits for negative-resistance bulk-effect devices have employed a half-wavelength open-circuited resonant section of stripline having capacitors at opposite ends of the stripline with the bulk-effect device being connected across the stripline at a point near a voltage null of the fundamental mode. Such an oscillator circuit is disclosed and claimed in U.S. Pat. No. 3,416,099 issued Dec. 10, 1968 and assigned to the same assignee as the present invention. In such a circuit, the conversion efficiency was found to be approximately 6 percent at L-band for average Gunn diodes, and the usual waveform of current from the Gunn device consisted of short pulses being repeated at the fundamental frequency of the oscillator. It is desired to provide a similar circuit having improved conversion efficiency.

It is also known from the prior art that the conversion efficiency of a bulk-effect negative-resistance device, such as a Gunn diode, can be improved by positioning the Gunn diode in a resonant circuit with the RF fields of the second harmonic of the circuit being coupled into the Gunn diode. It is believed that the improvement in conversion efficiency achieved is the result of the production of approximately a square wave of current by the Gunn device as it is biased alternately above and below threshold by an RF voltage wave, such as the half sinusoid wave produced when a fundamental sine wave voltage is combined with a second harmonic sine wave having half as much amplitude. However, if the RF voltage across the diode at the second harmonic, when superimposed upon the RF fundamental voltage and DC bias voltage, exceeds a certain voltage level the Gunn diode can enter into avalanche operation resulting in catastrophic failure thereof.

SUMMARY OF THE PRESENT INVENTION

The principal object of the present invention is the provision of an improved microwave oscillator circuit for low-impedance negative-resistance bulk-effect devices.

One feature of the present invention is the provision of a pair of variable lumped capacitors connected in shunt across the ends of a short length of stripline to form an open-circuited half-wavelength resonator tuned for a fundamental mode of resonance at the operating frequency of the oscillator and a bulk-effect negative-resistance device being connected in shunt with the resonant stripline at a point near a voltage null for the fundamental, the stripline reactance and the capacitors being tuned such that the second harmonic resonant mode develops the proper voltage across the negative-resistance device for improving the conversion efficiency of the oscillator.

Another feature of the present invention is the same as the preceding feature including the provision of a lumped capacitive element connected in shunt with the stripline at a point near the bulk-effect device to reduce the surge impedance of the stripline resonator, and to facilitate starting of oscillations at the fundamental frequency.

Another feature of the present invention is the same as any one or more of the preceding features including the provision of a slab of thermally conductive insulative material, as of beryllia, between the stripline conductors in heat-exchanging relation therewith to facilitate heat sinking of the bulk-effect device.

Another feature of the present invention is the same as any one or more of the preceding features wherein the output circuit of the oscillator includes a second half-wavelength open-circuited stripline with variable lumped capacitors connected in shunt at the open-circuited ends thereof, such second resonator being tuned for a fundamental mode of resonance at the operating frequency of the oscillator and being tuned such that the second harmonic of the second stripline resonator is detuned in frequency from the second harmonic of the oscillator, whereby the second harmonic output of the oscillator is suppressed.

Other features and advantages of the present invention will become apparent upon a perusal of the following specification taken in connection with the accompanying drawings wherein:

DESCRIPTION OF THE PREFERRED EMBODIMENTS

Figure 1:
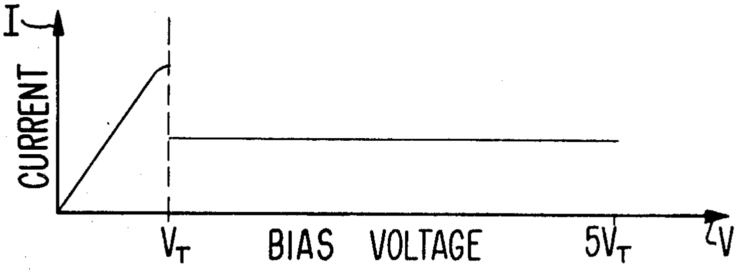
FIG. 1 is a plot of DC current I versus DC bias voltage V for a typical bulk-effect negative-resistance semiconductive device to be employed in the circuit of the present invention.

Referring now to FIG. 1, there is shown the DC current I versus DC bias voltage V characteristics for a typical bulk-effect negative-resistance semiconductive device, such as a Gunn diode. As the bias voltage V is increased, the current I increases until a certain threshold voltage $V_t$ is applied. At $V_t$, the current I drops and remains nearly constant with increasing voltage. Concurrent with the drop in current the device breaks into microwave oscillations, thereby converting DC power into microwave power. The oscillations are associated with a bulk-effect negative-resistance of the semiconductive device. As used herein, "bulk-effect negative-resistance devices," are defined to mean devices which convert DC power into microwave power due to mechanisms related to the bulk properties of the semiconductive device, as contrasted with other types of negative-resistance devices which convert DC power into microwave power predominantly due to properties of a PN-junction. Bulk-effect devices are typified by Gunn diodes operable in various modes, such as transit time, quenched domain, delayed domain, limited space charge accumulation, and hybrid modes.

The high-efficiency mode obtained with the preferred embodiment may be termed a delayed domain mode. The thickness of the semiconductor material is not critical in this circuit, and devices with thicknesses ranging from 100 microns to 25 microns have been successfully operated at 1,090 MHz fundamental frequency.

Figure 2:
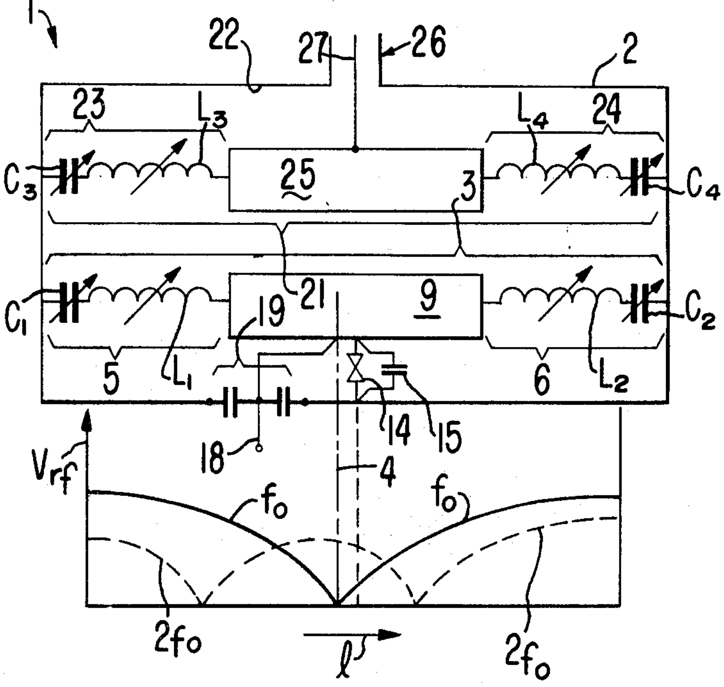
FIG. 2 is a schematic diagram of a microwave oscillator incorporating features of the present invention and accompanied by a plot of RF voltage V RF versus distance $d$ depicting the standing waves for the fundamental and second harmonic of the oscillator.
Figure 3:
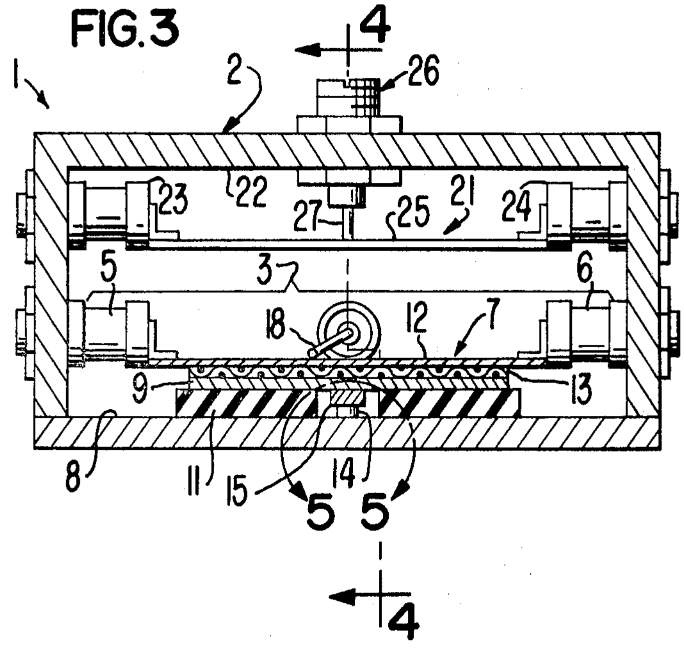
FIG. 3 is a longitudinal sectional view of a microwave oscillator of the present invention.
Figure 4:
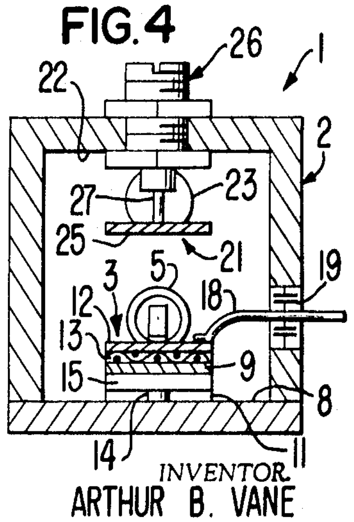
FIG. 4 is a sectional view of the structure FIG. 3 taken along line 4—4 in the direction of the arrows.

Referring now to FIGS. 2, 3, and 4, there is shown a bulk-effect L-band microwave oscillator 1 incorporating features of the present invention. The oscillator 1 includes a hollow metallic housing 2 containing the microwave circuitry therein. The microwave circuit includes a first capacitively loaded half-wavelength resonant section of transmission line 3 which is open-circuited at its ends to provide a microwave voltage null plane 4 at a centrally located position along the length of the resonant stripline 9 (see the plot of microwave voltage $V_{RF}$ versus length 1 of the line 3, as indicated by the solid line $f_{o\ o}$ below the schematic diagram of FIG. 2).

A pair of air-dielectric variable lumped capacitors 5 and 6 are disposed at the ends of the resonant line section 3. As used herein, "lumped" is defined to mean that the electrically active length of the member, at its operating frequency, is less than one-quarter of a free space wavelength long. The capacitors 5 and 6 serve to hold one conductor 7 of the resonant line section in close contact with stripline conductor 9 above the other conductor 8, which is a ground plane formed by an inside wall of the housing 2. In addition, the capacitors 5 and 6 serve to provide DC isolation for the inner strip conductor 7 to permit application of a DC bias voltage thereto, as more fully described below. Also, the capacitors 5 and 6 capacitively load and add series inductance to line 3, thereby at resonance shortening its physical length when compared to a half of a wavelength at the fundamental or to a full wavelength at the second harmonic in stripline. Moreover, the capacitors 5 and 6 are made variable for changing the resonant frequency of the resonant section of line 3 and for shifting the position 4 of the microwave voltage null along the length of the stripline 9, as desired for impedance matching, more fully described below.

The stripline 9 is formed by a first strip conductor, as of silver-plated copper having a typical width as of 0.5 inch which is supported from the lower wall 8 of the housing 2 via the intermediary of a pair of thermally conductive electrically insulative slabs 11, as of beryllia. The beryllia slabs 11 are thin having a typical thickness, as of 0.060 inch. A second strip conductor 7 as of silver-plated copper overlays the first strip 9 and is fixedly secured at its ends to the trimmer capacitors 5 and 6. An electrically conductive mesh 13, as of gold-plated tungsten screen material, is disposed between the strip conductors 9 and 7 for assuring good electrical contact therebetween. Moreover, the wide conductor 9 and thin dielectric slabs 11 form a section of low-impedance stripline thereby reducing the surge impedance $\sqrt{L/C}$.

A bulk-effect negative-resistance device 14, such as a transit time mode Gunn diode, is connected in shunt across the stripline 9 near the fundamental voltage null position 4. Bulk-effect device 14, such as a single chip of gallium arsenide 60 mils square has a low field resistance as of 0.3 ohm, has a relatively low impedance for microwave energy, as of 6 ohms, and is placed near to the voltage null position 4 for impedance matching the device 14 to the resonant line 3 as coupled to a load. A capacitive loading ridge 15 extends transversely across the strip conductor 9. The loading member 15 comprises, for example, a copper strip brazed to the copper stripline 9, such loading member being silver plated. In a typical example, the lower edge of the capacitive loading ridge 15 is within 0.010 inch of the ground plane 8 of the housing.

Figure 5:
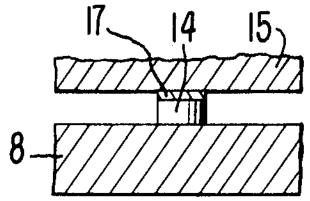
FIG. 5 is an enlarged fragmentary view of a portion of the structure of FIG. 4 delineated by line 5—5.
Figure 6:
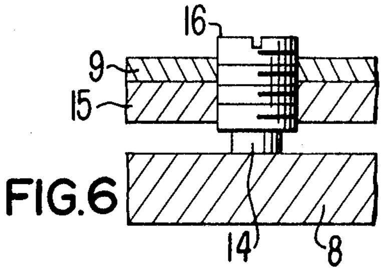
FIG. 6 is an enlarged fragmentary view of an alternative embodiment to the structure of FIG. 5.

The bulk-effect negative-resistance device 14, (see FIG. 6) is soldered or otherwise bonded at its lower terminal to the ground plane conductor 8 and the upper terminal of the bulk-effect device 14 is electrically connected to the ridge 15 by means of an electrically and thermally conductive stud 16, as of tellurium copper, which is threaded through a tapped hole in the conductor 9 and ridge 15 and which bears against the upper terminal of the Gunn diode 14 for making electrical contact to the diode 14 and for heat sinking same. Alternatively (as shown in FIG. 5) a thin strip of solder foil 17 may be pressed between the upper terminal of the Gunn diode 13 and the lower edge of the capacitive loading ridge 15 for assuring good electrical and thermal contact between the diode and the ridge 15. The beryllia slabs 22 greatly facilitate heat sinking of the diode 14 by providing a thermally conductive path from conductor 9 through the slab 11 to the heat-sinking ground plate 8 of the housing 2.

Referring now to FIGS. 3 and 4, a DC bias potential, as of 3.5 $V_t$ volts, is pulsed at a repetition rate of 20 kilohertz each of 500 nanoseconds duration with rise time of 30 nanoseconds, and is applied across the bulk-effect device 14. The bias voltage with respect to the grounded housing 2 is fed onto the inner conductor 7 and thence to 9 from the pulsed source, not shown, via lead 18. Lead 18 is bypassed for microwaves to the housing 2 via a feedthrough bypass capacitor 19. Lead 18 is short and relatively large in diameter to reduce series inductance to the high current bias pulses, thereby reducing the voltage overshoot at the Gunn diode 14 caused by the sudden reduction in current when the diode bias voltage exceeds threshold $V_t$ as shown in FIG. 1. Microwave coupling to lead 18 is kept very small by placing it away from the dielectric slabs 11 wherein most of the microwave electric fields are concentrated. Moreover, lead 18 is connected to the inner conductor 7 substantially at the microwave voltage null point 4 in order to further reduce microwave energy coupling to the bias circuit.

The resonated stripline 9 has a characteristic impedance $Z_o$ of approximately 5 ohms. The stripline is made relatively wide as indicated in FIG. 4 with substantial capacitive loading via beryllia insulators 11 and with relatively close spacing, as of 0.060 inch, between the inner conductor 9 and the ground plane 8, such that the surge impedance of the line is reduced to a low value. Moreover, the shunt capacity provided by capacitive loading element 15 further serves to reduce the surge impedance of the line, especially for the second harmonic. A very low surge impedance is desirable to keep the electric field across the Gunn diode 13 from being excessive and thereby causing avalanche current to flow when oscillations first begin. Moreover, the shunt capacitor 15 facilitates the starting of the oscillations at the fundamental frequency as soon as a bias voltage pulse is applied. Without the capacity provided by element 15 some Gunn diode chips, particularly chips with low threshold voltages, will start to oscillate at only the second harmonic frequency and there can be a delay of many nanoseconds before fundamental oscillations begin.

Capacitors 5 and 6, as of conventional air trimmer capacitors, not only include their capacitance $C_1$ and $C_2$, respectively, but also series self inductances $L_1$ and $L_2$, respectively. The series inductances change with tuning of the capacitors and, in addition, the inductances are frequency sensitive such that the series inductance of the capacitors is substantially different at the second harmonic of the resonator 3, as compared to the value of the inductances at the fundamental. Capacitors 5 and 6 are adjusted such that for the fundamental frequency $f_o$ the impedance of the load at terminal 26 as coupled from resonator 21 is transformed such that there appears at the terminals of Gunn diode 14 no less than the conjugate of the Gunn diode impedance at $f_o$. The tuning is then such that a voltage null point for the fundamental frequency $f_o$ is produced at a null plane 4 near the position of the Gunn diode 14, which is generally located midway along the length of the resonator 3. In addition, capacitors 5 and 6 are adjusted such that one of the voltage nulls of the second harmonic $2f_o$, as indicated by the dotted lines in the voltage plot below FIG. 2, is brought near to the transverse plane of the Gunn diode 14.

The frequency $2f_o$ is not coupled to the external load and best efficiency and the most stable operating characteristics are obtained when circuit losses are minimized for the second harmonic frequency.

The amplitude of the second harmonic voltage must be sufficient to combine with the fundamental voltage wave such that the total electric field at the terminals of the Gunn diode 14 is well above threshold $V_t$ for a first half cycle then slightly below threshold to delay domain formation for a second half cycle of fundamental frequency. Such operation will cause the current in the diode 14 to be approximately a square wave at the fundamental frequency and thereby result in efficient conversion of DC to RF power. When the voltage swings below threshold, power will be lost in the positive resistance of the diode 14, therefore harmonic frequencies are used to reduce the negative portion of the RF voltage cycle thereby increasing the efficiency.

For a Gunn diode biased by DC to slightly above threshold, the second harmonic voltage at the diode should be one-half the fundamental voltage at the diode, such combination yielding an approximate half sinusoid RF voltage being applied to the diode. For a Gunn diode biased higher, such as 3.5 $V_t$, the second harmonic voltage at the diode terminals must be greater in proportion to the fundamental for best efficiency. The gain in power and efficiency resulting from higher voltage operation greatly exceeds the additional power loss which results from a greater voltage swing below $V_t$.

The second harmonic voltage in the diode should be kept below the breakdown or avalanche value but should be sufficiently strong to add to the fundamental voltage in the diode to produce a total waveform approximating that of a half sinusoid. In order to prevent breakdown, the RF voltages of the fundamental and second harmonic as superimposed upon the bias potential should reach a total voltage less than the avalanche voltage.

With the benefit of a second harmonic voltage, the conversion efficiency at L-band of the oscillator is typically improved from approximately 6 percent to 15 percent. More particularly, a single chip gallium arsenide 50-mil square bulk-effect transit time mode diode has been operated at 240 watts peak at a 1 percent duty factor with a conversion efficiency of 15 percent at the L-band frequency of 1,090 megahertz. This was achieved with a bias voltage of 3.5 $V_t$ which is approximately 60 volts. Higher efficiencies can be achieved by increasing the DC bias voltage to higher multiples of $V_t$ such as for example to 5 $V_t$ when best quality GaAs diodes are used.

In order to position a voltage null for the second harmonic near the central position of the diode 14, while also obtaining a voltage null for the fundamental near the diode 14, one of the capacitors 5 or 6 must present a substantially greater product of capacitance and self inductance than the other capacitor. For the cases illustrated by the RF potentials indicated in FIG. 2, capacitor 5 would have a substantially greater capacitance $C_1$ than capacitor 6. In addition, the series inductance $L_1$ would be substantially greater than the series inductance $L_2$ of the second capacitor 6. This inductive and capacitive loading, which is frequency sensitive, tends to electrically lengthen the more highly loaded end of the resonant stripline 3 such that the voltage nulls are shifted toward the loaded end of the line, as indicated by the solid and dotted lines of FIG. 2. The frequency-sensitive nature of the reactive loading by proper adjustment, permits location of the nulls of both the fundamental and second harmonic waves of resonance near the diode 14.

A second half-wavelength section of resonant line 21 is disposed within the housing 2 along a mutually opposed inner wall 22. This second resonant line 21 forms a resonant output circuit and is essentially similar to and electromagnetically coupled to the first half-wave resonant line 3. A pair of lumped trimmer capacitors 23 and 24 are connected in shunt across the ends of the resonant line 21 for physically supporting the inner stripline conductor 25, as of silver-plated copper, above the ground plane member 22.

The ground plane member 22 is spaced from the inner stripline conductor 25 by sufficient space such that the characteristic impedance of the stripline 25 is approximately within the range of 100 to 50 ohms. An output coaxial line 26 is coupled through the housing 2. The inner conductor 27 of the coaxial line 26 extends through the housing and makes electrical contact to the stripline conductor 25 of the line 21 at a point substantially midway along the length thereof. Capacitor 23 includes variable capacitance $C_3$ and variable inductance $L_3$ (see FIG. 2), such inductance also being a function of frequency. Likewise, capacitor 24 has a variable capacitance $C_4$ and a variable inductance $L_4$ such inductance being a function of frequency. Capacitors 23 and 24 are tuned to resonate the line 21 at the fundamental mode of the first line 3 and, thus, for the operating frequency of the oscillator 1. However, the capacitors 23 and 24 are also tuned such that the second harmonic of the second resonator 21 is detuned from the second harmonic of the first resonator 3. In this manner the second harmonic signal generated in the first resonator 3 is not coupled to the second resonator 21 for coupling to the load. More particularly, the capacitors 23 and 24 are tuned such that the second harmonic in the second resonator 21 is detuned sufficiently to reduce the coupling of the second harmonic to the load by more than 20 db. relative to the coupling for the fundamental signal.

Although the oscillator, as thus far described, employed only a single Gunn effect diode 14, this is not a requirement and, in fact, substantially greater power output can be obtained by connecting a plurality of such diodes in parallel across the width of the transmission line 9 between the inner edge of the loading ridge 15 and the inside surface of the ground plane 8. In a preferred embodiment the Gunn effect diodes are dimensioned to have a transit time mode frequency of operation within plus or minus 30 percent of the operating frequency of the oscillator 1. Thin diodes with transit time frequencies as much as four times the oscillator frequency can be operated with high efficiencies in this circuit, but such operation is accompanied by an undesirable random delay in the starting time of fundamental oscillation after application of each bias pulse.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a microwave oscillator circuit, means forming a length of stripline transmission line, a pair of variable lumped capacitors connected in shunt with said stripline at opposite ends thereof to define a half-wavelength resonator open-circuited at its ends and tuned for a fundamental mode of resonance at the operating frequency of the oscillator, a bulk-effect negative-resistance semiconductive device connected in shunt with said resonated stripline at a point intermediate the length thereof such point of connection being near the voltage null of said resonator for the fundamental mode of resonance for matching the low impedance of the bulk-effect device to the low impedance of said resonator near said voltage null, THE IMPROVEMENT WHEREIN, the product of capacitance and self inductance of said capacitors at the second harmonic of the operating frequency of the oscillator is substantially greater at one end of said stripline than the other end to position the voltage null of the second harmonic of the oscillator near the position of said bulk-effect device to improve the conversion efficiency of the oscillator, and further including the provision of a capacitive member connected in shunt with said stripline substantially at the position of said bulk-effect device to facilitate the start of oscillation of the oscillator at the fundamental operating frequency.

2. The apparatus of claim 1 including a slab of thermally conductive insulative material disposed in between the stripline conductors of said resonator in heat-exchanging relation therewith to facilitate heat sinking of said bulk-effect device.

3. The apparatus of claim 1 wherein said stripline is dimensioned to have a characteristic impedance less than 10 ohms to provide a low surge impedance of said stripline.

4. The apparatus of claim 1 including a second length of stripline, a second pair of lumped capacitors connected in shunt with said second stripline at opposite ends thereof to define a half-wavelength resonator open-circuited at its ends and tuned for a fundamental mode of resonance at the operating frequency of the oscillator, said second resonant stripline being electromagnetically coupled to said first stripline resonator, said second capacitors having values of capacitance and inductance to detune the second harmonic of said second stripline resonator from the second harmonic frequency of the oscillator, an output coupling means coupled to said second stripline resonator for extracting the output microwave energy from said second resonant stripline, whereby the second harmonic output of the oscillator is suppressed.

5. The apparatus of claim 1 wherein said bulk-effect device is a Gunn effect diode dimensioned to have a transit time mode frequency of operation within ±30 percent of the operating frequency of the oscillator.

* * * * *